W. J. GLEASON, J. ZECHENELLY & A. L. BLUM.
SEWER PLUG.
APPLICATION FILED JAN. 6, 1909.

922,275.

Patented May 18, 1909.

W. J. Gleason,
Jacob Zechenelly,
A. L. Blum,
Inventors.

Witnesses
F. A. Milligan
C. M. Ebnest

By H. N. Jenkins
Attorney

UNITED STATES PATENT OFFICE.

WILLIAM J. GLEASON, JACOB ZECHENELLY, AND ALPHONSE L. BLUM, OF NEW ORLEANS, LOUISIANA.

SEWER-PLUG.

No. 922,275.  Specification of Letters Patent.  Patented May 18, 1909.

Application filed January 6, 1909. Serial No. 471,027.

*To all whom it may concern:*

Be it known that we, WILLIAM J. GLEASON, JACOB ZECHENELLY, and ALPHONSE L. BLUM, citizens of the United States, residing at New Orleans, in the parish of Orleans and State of Louisiana, have invented new and useful Improvements in Sewer - Plugs, of which the following is a specification.

This invention relates to a device for closing sewers, at such times as it may be necessary to clean same, the object being to prevent the flow of water, &c., from interfering with the progress of the work.

The invention is clearly shown in the accompanying drawing, whereon—

Figure 1:
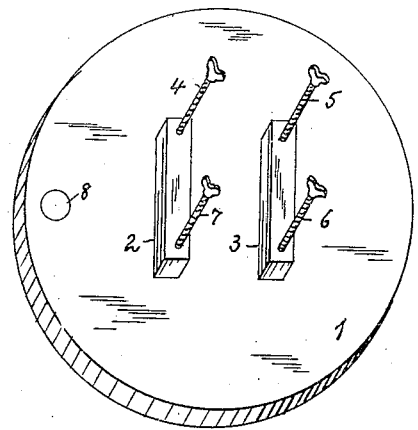
Figure 3:
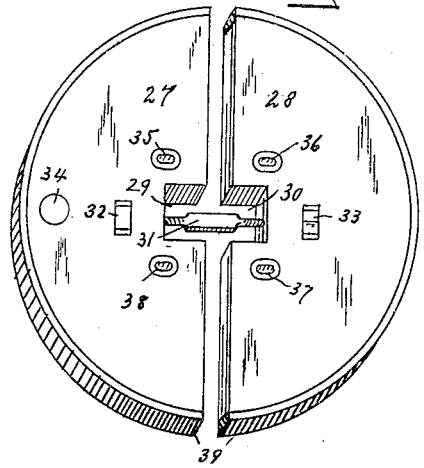
Figure 2:
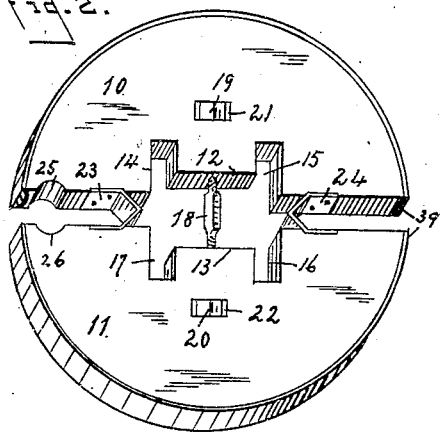
Figure 4:
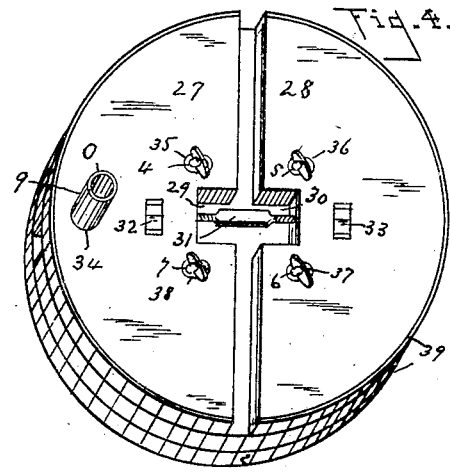

Figure 1 is a perspective view of the lower member of the device, Fig. 2 is a perspective view of a second member, or middle section thereof, Fig. 3 represents a third member, or top section of the device, and Fig. 4 a perspective, from the upper side, of the device complete and ready for use.

The lower member of the device is composed of a disk 1, the under surface of which is provided with a pair of parallel guides or bars 2, 3, the ends of which are drilled and tapped for the reception of screws 4, 5, 6, 7, which serve to keep the several parts of the device together, as hereinafter set forth. The disk 1 is furthermore provided, on the transverse central line of its guides, with a circular hole 8, for the reception of a relief pipe 9, which is adapted to pass through the several sections of the device.

The second or middle portion of the device is composed of a pair of semi-circular plates 10, 11, the straight edges of which are recessed so as to have parallel central edges 12, 13, terminating in right-angle slots 14, 15, 16, 17; the plates 10, 11, are each provided with a transverse bolt-hole for the reception of a connecting stud 18, the ends of which are provided, respectively, with right and left screw-threads for engaging nuts 19, 20, that are fitted in openings 21, 22, to receive the same, so that the turning of the stud will cause the plates 10, 11, to move to, or from one another. The plates 10, 11 are furthermore connected, by means of strips of rubber or other like material 23, 24, which serve as valves to prevent flow of water, when the device is in use.

The numerals 25, 26, designate semi-circular recesses in the edges of the plates 10, 11, to correspond with the pipe hole 8, of the disk 1.

The third section, or top of the device is likewise formed of two semi-circular plates 27, 28, the straight edges of which are recessed as at 29, 30, and provided with a connecting stud 31, the ends of which are, respectively, provided with right and left screw-threads to operate in nuts 32, 33, so as to move the plates inwardly or outwardly as in the second section, but at right angles therewith, the plates being relatively so arranged. One of the plates of the third section, is provided with a pipe-hole 34, to match the pipe-openings of the other sections, for the reception of the relief pipe 0 within which is fitted an automatically operating valve, not necessarily shown. The third sections or top plates of the device are furthermore provided, at right angles with the straight edges thereof, with elongated bolt-holes 35, 36, 37, 38, through which the screws 4, 5, 6, 7, are first passed, in order to secure the several sections together. The sliding movement of the plates being limited by the length of the said slots.

To insure a close fit and thus prevent leakage around the device, the periphery of the movable plates are provided with rubber, or other elastic material, designated by the numeral 39, which may consist of an endless band, the periphery being grooved to receive same, or strips of material may be secured to the curved edges of the plates in any desired manner.

Having described our invention, what we claim as new and desire to secure by Letters Patent, is—

1. In a sewer plug, the combination of a disk having parallel guides at one side thereof, a pair of semi-circular plates provided at the straight edges thereof with recesses terminating in right angle slots, a stud having oppositely inclined screw-threaded ends and nuts fitted in the semi-circular plates for the purpose set forth.

2. In a sewer plug, the combination of a disk provided at one side with parallel guides, and a pair of semi-circular plates, the straight edge of each plate recessed and having slots to receive the guides of the disk, a stud with right and left screw-threaded ends and nuts fitted in the plates to engage same, with valve connections between the plates, as set forth.

3. In a sewer plug, a disk provided with parallel guides and a pipe opening, in combination with two pairs of semi-circular plates, the straight edges of said plates recessed and slotted as described, studs and nuts whereby the pairs of plates are operated at right angles to one another, one pair of plates having valve connections, a pipe opening to each pair of plates, elongated slots in the top plates and screws whereby the disk and plates are secured together, as set forth.

4. The combination in a sewer plug, of a disk provided at one side thereof with parallel guides and screws fitted in the ends of same, a pair of semi-circular plates having recessed and slotted edges, a stud and nuts adapted to receive the oppositely threaded ends of the stud, elastic valves connecting the plates; with a second pair of semi-circular plates arranged at right angles to the first pair, a stud and nuts for operating same, the second pair of plates provided with elongated slots for the passage of the guide-screws, as set forth.

In testimony whereof, we have hereunto set our hands this 29th day of December A. D. 1908.

WILLIAM J. GLEASON.
JACOB ZECHENELLY.
ALPHONSE L. BLUM.

Witnesses:
  FRANCIS V. WEST,
  JAMES H. WRIGHT.